US012364277B2

(12) United States Patent
Broderick et al.

(10) Patent No.: US 12,364,277 B2
(45) Date of Patent: Jul. 22, 2025

(54) AUTOMATED PEELING SYSTEM

(71) Applicant: Tomra Sorting Limited, Dublin (IE)

(72) Inventors: Michael Broderick, Carlow (IE); Doug Reid, Dublin (IE); John Mcgloughlin, Kildare (IE)

(73) Assignee: TOMRA SORTING LIMITED, Dublin (IE)

( * ) Notice: Subject to any disclaimer, the term of this patent is extended or adjusted under 35 U.S.C. 154(b) by 886 days.

(21) Appl. No.: 17/123,731

(22) Filed: Dec. 16, 2020

(65) Prior Publication Data

US 2021/0345655 A1    Nov. 11, 2021

(30) Foreign Application Priority Data

Dec. 11, 2019  (EP) ................................ 19215440

(51) Int. Cl.
*A23N 7/02* (2006.01)
*A23N 7/10* (2006.01)
(52) U.S. Cl.
CPC ............... *A23N 7/023* (2013.01); *A23N 7/10* (2013.01)
(58) Field of Classification Search
CPC . A23N 7/00; A23N 7/005; A23N 7/02; A23N 7/023; A23N 7/10

USPC .......................................... 99/537–540, 569
See application file for complete search history.

(56) References Cited

U.S. PATENT DOCUMENTS 4,831,922 A * 5/1989 Cogan ................... B07C 5/3422
356/625
5,550,927 A * 8/1996 Zittel .................... G06T 7/0004
209/939

FOREIGN PATENT DOCUMENTS

WO    WO-9729652 A1 *  8/1997  .............. A23N 7/02

* cited by examiner

*Primary Examiner* — Chris Q Liu
*Assistant Examiner* — James F Sims, III
(74) *Attorney, Agent, or Firm* — Boone IP Law

(57) ABSTRACT

A peeling process and system comprising a primary peeling device; a sorting device arranged to sort product output from the primary peeling device into peeled product and partially peeled product; a secondary peeling device arranged to receive the partially peeled product output from the sorting device; and a peel control system to monitor the peel quality of product detected in at least one position after the primary peeling device and control the peeling system in response to same.

19 Claims, 1 Drawing Sheet

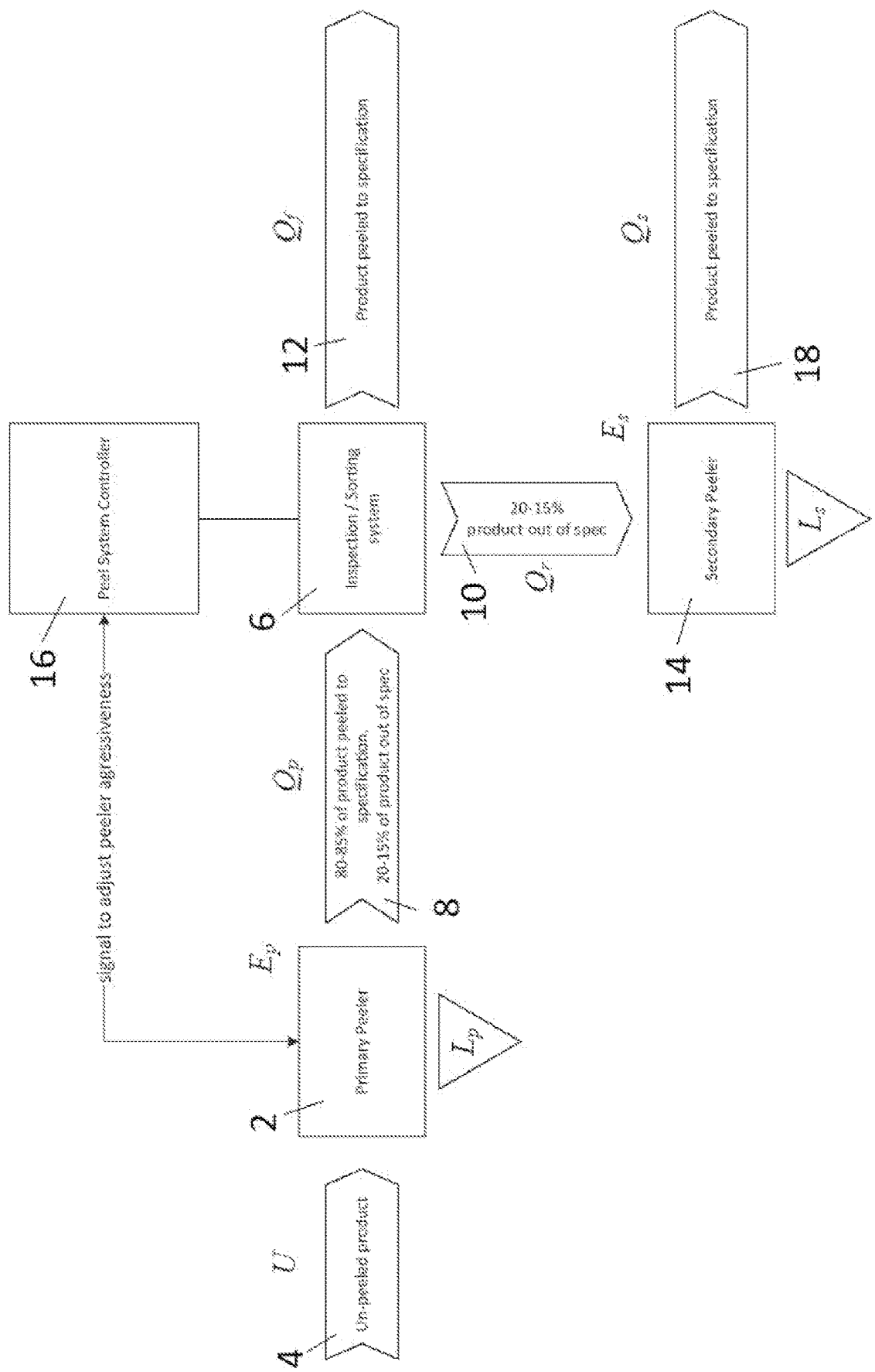

AUTOMATED PEELING SYSTEM

FIELD OF THE INVENTION

The present invention relates to the surface finishing of product such as root vegetables, fruit, nuts, which includes peeling and polishing where a degree of the outer layer of the product is removed.

BACKGROUND OF THE INVENTION

Mechanical peeling methods are used on many food processing lines including potato processing lines for strip cut and sliced potato products. Peeling machines can take many forms including steam peelers, abrasive peelers and knife peelers. Other forms of peeling machine can employ chemical peeling methods like caustic and lye peeling. In some cases the peeling device will also be used to remove some surface defects and blemishes. When used herein the term "peeling" is intended to refer to any manor of outer surface removal, including but not limited to peeling by steam, abrasion, knife, chemical, polishing, blanching etc.

Peeling systems remove a thin layer of the product being peeled, ideally just the layer containing the peel or rind, with minimal or no removal and loss of the adjacent good product flesh. However, some of the good product is removed and all peeling systems must deal with this conflict of removing maximum peel and surface defect while minimizing loss of good product. The greatest challenge to a peeling system is the minimization of good material loss while maximizing the removal of peel or the unwanted outer surface. A secondary concern to the industry using peeling systems is the energy consumption of the system, which should be minimized while still removing the peel at economical production rates.

Traditionally peeling systems consisted of the device that removed the peel from the product, this may be an abrasive disk of set of rollers, or a series of spinning knife blades, steam pressure or a hot bath of caustic soda. These devices were often followed by some equipment to clean/separate the debris/peel from the good product, like a washer or brusher or other dry peel separation devices. Optical inspection devices were also deployed after the peeling device to evaluate the remaining peel on product and adjust the aggressiveness of the peeling device to remove more or less of the surface to bring the product to an approximation of the required quality. Not over-peeling and loosing good volume from the finished product, and not under-peeling, producing a sub-standard product that is unappealing to consumers.

A problem with all prior peeling systems is that the product being peeled does not have consistent peel, and where 80-85% may be easy to peel, 20 to 15% will be more difficult. If the system is set up to minimize the product loss from over-peeling, then that 20-15% will not be peeled properly. If the peeler is adjusted to be more aggressive, to make sure even the difficult 20-15% is sufficiently peeled, then the remaining 80-85% will lose a substantial volume of their surface, reducing product yield.

It is an object of the invention to provide an efficient bulk peeling system with reduced product loss and reduced energy consumption.

SUMMARY OF THE INVENTION

This invention incorporates a primary peeler, a sorting device and a secondary peeler to overcome this dual nature of the product being peeled.

Accordingly the present invention provides, as set out in the appended claims, a peeling system comprising a primary peeling device; a sorting device arranged to sort product output from the primary peeling device into peeled product and partially peeled product; a secondary peeling device arranged to receive the partially peeled product output from the sorting device; and a peel control system to monitor the peel quality of product detected in at least one position after the primary peeling device and control the peeling system in response to same.

The peel control system may be configured to control the operation of one or more components of the peeling system. The peel control system may be configured to control one or more components of the peeling system in response to the detected peel quality. The components may comprise the primary peeling device, the sorting device and the secondary peeling device. The peel control system may be configured to control one or more of the primary peeling device, the sorting device and the secondary peeling device in response to the detected peel quality.

The peel control system may be configured to monitor the peel quality of bulk product detected in at least one position after the primary peeling device and control the peeling system in response to same. The peel control system may be configured to monitor the average peel quality of product detected in at least one position after the primary peeling device and control the peeling system in response to same.

The peel control system may be configured to monitor the peel quality of product detected in at least one position after the primary peeling device and control the sorting device of the peeling system in response to same. The peel control system may be configured to monitor the peel quality of product detected in at least one position after the primary peeling device and additionally or alternatively control the primary peeling device of the peeling system in response to same.

Preferably the primary peeling device is controllable. Preferably the primary peeling device is adjustable. The aggressiveness of the primary peeling device may be adjustable. The peel control system may be adapted to adjust the peel aggressiveness of the primary peeling device in response to the detected quality at the at least one position.

Preferably the sorting device is controllable. Preferably the sorting device is adjustable. The sorting device may be adjustable to vary a sort quality used in the sorting process. The sorting device may be adjustable to change the volume of product sorted as partially peeled product or peeled product. The peel control system may be adapted to control the sort quality of the sorting device in response to the detected quality at the at least one position.

The at least one position may comprise the output of the primary peeling device. The at least one position may comprise the input of the secondary peeling device. The at least one position may comprise the output of the secondary peeling device.

Preferably the secondary peeling device is controllable. Preferably the secondary peeling device is adjustable. The aggressiveness of the secondary peeling device may be adjustable. The peel control system may be adapted to adjust the peel aggressiveness of the secondary peeling device in response to the detected quality at the output of the secondary peeling device.

The at least one position may comprise the output of the sorting device.

The peel control module may be a component of the sorting device. Alternatively the peel control module may be a standalone part of the peeling system.

The secondary peeling device and the first peeling device may be the same peeling device. The secondary peeling device may be incorporated within the first peeling device. The secondary peeling device may be a portion of the first peeling device.

The peeling system may further comprise a secondary sorter configured to divert product that is insufficiently peeled back into the secondary peeling device for more peeling.

The peeling system may further comprise means for conveying product from the output of the secondary peeling device through the sorting device, separate from the flow from the primary peeling device. The means for conveying may comprise a segmented channel of the sorting device. The peeling system may further comprise means for conveying any remaining insufficiently peeled product to the secondary peeling device to be re-peeled by the secondary peeling device. The peel control system may be configured to identify in an image of the product output from the sorting device the portion of the flow through the sorting device that comes from the primary peeling device, and the portion of the flow that comes from the secondary sorter.

The at least one position may be within the sorting device. The peel control system is configured to monitor the peel quality of product using data from the sorting device. The data may comprises image data. The peel control system may be integrated within the sorting device.

The at least one position may comprise the output of the peeling system. The peel control system may be configured to monitor the peel quality of product output from the peeling system, detected at the output of the peeling system and control the peeling system in response to same.

The present invention further provides a peeling process comprising: peeling product using a primary peeling device; sorting product output from the primary peeling device into peeled product and partially peeled product; re-peeling the partially peeled product; monitoring the peel quality of product detected in at least one position after the primary peeling device; and controlling the peeling process in response to same.

The peeling process may further comprise adjusting the peel aggressiveness of the primary peeling device in response to the detected quality at the at least one position.

Controlling the peeling process may comprise controlling the sort quality of the sorting in response to the detected quality at the at least one position. This controlling step can achieve changes in the volume of product sorted from the bulk flow, for example the volume of product sent to the secondary peeler.

When used herein, the term "peel aggressiveness" relates to how much peel is removed during peeling. If the peel aggressiveness of a peeler is increased, this means that more peel will be removed by the peeler. A decrease in aggressiveness will result in less peel being removed by the peeler.

The at least one position may comprise the output of the primary peeling device. The at least one position may be in the path of the partially peeled product. The at least one position may be in the path of the re-peeled product. Controlling the peeling process may comprise adjusting the peel aggressiveness of the re-peeling in response to the detected quality of the re-peeled product.

The at least one position may be in the path of the peeled product.

The peeling process may further comprise sorting the re-peeled product into peeled product and partially peeled product and re-peeling the partially peeled re-peeled product.

Adjusting the aggressiveness of the secondary peeling device makes sure the output of the secondary peeling device is sufficient to be combined with the output from the sorter (main product flow). Ideally the quality of re-peeled product is equal to or greater than the quality of the peeled product.

The present invention further provides a computer program product comprising instructions which, when the program is executed by a computer, cause the computer to carry out the above process.

The present invention further provides a computer-readable storage medium comprising instructions which, when executed by a computer, cause the computer to carry out the above process.

It will be appreciated that by segregating product with difficult peel, the present invention can remove more difficult to remove peel while reducing overall product loss and maintaining low energy consumption. This is achieved by avoiding having to set the first peeling device to peel all product to quality. The peel control system within the peeling system of the present invention ensures that difficult to remove peel is directed to a secondary peeling device to be re-peeled. One example of control the peeling system may be increasing the aggressiveness of the peeling device when the percentage of product being sent for re-peeling increases beyond a desirable threshold. Another example might be adjusting the sort quality of the sorting device to divert or kick out higher quality product in response to quality of the peeled product dropping.

BRIEF DESCRIPTION OF THE DRAWINGS

Embodiments of the invention will be described, by way of example only, with reference to the accompanying drawings in which:

FIG. 1 is a schematic of one embodiment of peeling system in accordance with the present invention.

DETAILED DESCRIPTION OF THE DRAWINGS

FIG. 1 shows one embodiment of peeling system in accordance with the present invention. The primary peeler 2 is set to handle all the product 4 to be peeled and is set up to correctly and sufficiently peel the majority of the product, the remaining percentage will be peeled, but to a lesser degree and sub-standard. The sorting device (sorter) 6 then takes the flow 8 of the peeler and sorts the under peeled and below quality product 10, diverting it to the secondary peeler. The good correctly peeled product 12 continues to the output of the system. This product is peeled to the required specification which may be present. The secondary peeler 14 is set up to make sure the under peeled product is completely peeled and makes specification. If the secondary peeler has to over-peel some of the remaining product to make sure it is all to the correct specification, then there will be some losses, but these will be much lower than what would have been lost from the majority of the main flow if 100% of product was peeled with the same aggressiveness. The complete system is dynamic and needs to self-adjust based on the quality and variations in the incoming unpeeled product.

A peel control system 16 is required to monitor one or various points in the system and balance the various system operations of primary-peeling and/or sorting and/or secondary peeling. The peel control system 16 monitors peel quality by image analysis using images from at least one point in the system which could be images supplied by the sorting system. Alternatively, the images used may not come from the sorter but from an independent camera or sensor. Other ways of monitoring peel quality may be employed in alternative embodiments. The sensor or camera may be located after the sorter. The quality Q, of the product flow out of the sorter is a primary control point for the system as the purpose of the system is to produce consistent quality peeled product. The detected quality may be used by the peel control system to control parameters of one or more parts of the peeling system. One example of a parameter is the aggressiveness of the primary peeler. The peel control system 16 in this embodiment adjusts the aggressiveness of the primary peeler 2 so that a high percentage of the product is correctly peeled, and the sorting device 6 is configured to divert the remaining percentage of under-peeled product 10 to the secondary peeler 14. The peeling system needs to be able to adapt depending on the type and properties of the product to be peeled. Different varieties of the same type of product will have different peel qualities and some varieties will be easier to peel than others. Likewise, products from different sources may have different peel qualities and products from some suppliers or regions will be easier to peel than others. The stage of the season can also influence peel, so for example product harvested early in a growing season typically will require less aggressive peeling. Such variation can occur between consecutive batched being fed into the peeling system so it is essential the system is dynamic. When peeling easier to peel product, then the aggressiveness of the primary peeler 2 can be reduced by the peel control system 16, and less good product volume is lost, until a high percentage of the easy to peel product is correctly and sufficiently peeled. The sorting device 6 is set up to divert the remaining percentage of under-peeled product to the secondary peeler 14 where the remaining peel is removed. When the product to be peeled has peel that is more difficult, the peel control system in this embodiment increases the aggressiveness of the primary peeler 2, but only enough to peel a high percentage of this tougher product variety correctly and to specification. The sorting device 6 continues to divert the remaining percentage of under-peeled product to the secondary peeler 14 where the remaining peel is removed.

This is just one example of operation of the system shown in FIG. 1. Other methods of operation are possible in accordance with the present invention.

In FIG. 1, U represents unpeeled quality, $Q_p$ represents quality from primary peeler 2, $Q_f$ represents quality finished after sorting device 6, $Q_r$ represents quality diverted from sorting device 6, $Q_s$ represents quality after secondary peeler 14. $E_p$ represents energy consumption of the primary peeler 2, $E_s$ represents energy consumption of the secondary peeler 14. $L_p$ represents losses from the primary peeler 2 and $L_s$ represents losses from the secondary peeler 14.

The peel control system 16 may monitor data and images from more than one source to control the performance and operation of at least one of the primary peeler, the sorting device and the secondary peeler.

In one embodiment of the system an inspection method can be placed on the output of the secondary peeler 14. Images from this location are used to adjust the aggressiveness of the secondary peeler to make sure the output 18 of the secondary peeler is sufficient to be combined with the output from the sorter (main product flow).

The system can further have a secondary sorter (not shown) after the secondary peeler, wherein the secondary sorter is configured to divert product that is insufficiently peeled back on a conveyance method which brings the under-peeled product back into the secondary peeler 14 for more peeling.

Another embodiment of the system can convey the output of the secondary peeler 14 through a segmented channel of the sorting device 6, keeping the flow 8 from the primary peeler 2 separate from the flow from the secondary peeler 14. The sorting device 6 can then inspect and sort this secondary stream, diverting any remaining insufficiently peeled product out to be re-peeled by the secondary peeler 14. The good correctly peeled product continues-on with the good product 12 from the main flow. In this embodiment the peeler control system should identify in the image the portion of the sorting device that comes from the primary peeler 2, and the portion of the flow that comes from the secondary sorter.

In one embodiment a single unit may be used to monitor quality at more than one location. For example, a single camera/sensor unit may be able to monitor quality at the output of the sorter and at the output of the secondary peeler. The unit may with utilise separate imaging feeds from sensors/cameras at these locations.

In contrast to a multi-pass (or incremental) peeler where individual product in a product flow output from a peeler is identified as needing more peeling and sorted from the flow to be fed back into the peeler a second or subsequent time, the present invention is a one-pass complete peel system.

Rather than passing under peeled product multiple times through a peeler until it is peeled, the present invention maintains a constant flow of product through the system. This is desirable as the longer peeled product spends in the peeling system, the more oxidising of the flesh occurs. If the product spends too much time within the peeling system, the flesh oxidises and the quality of the product reduces. The present invention comprises peeling the majority of product in the flow to a desired quality using the primary peeler, and using a second peeler to address difficult to peel product. This ensures a constant flow of product in, through, and out of the system. This provides an improvement in the capacity of the peeling system over prior art systems. Damage to product is also reduced by the single pass.

Rather than assessing the quality of individual product, the present invention assesses the quality of the bulk flow of product to ensure it meets specification and makes adjustments to the peel system as required if the quality of the bulk flow of product is below specification. The assessment can take place at one point in the system or at multiple points. The assessment may comprise determining an average peel quality from the product flow.

The peel control system of the present invention is not a single entity or piece of hardware, such as a sorter or camera. It is a whole system which works together to control the peel process and achieve a desired quality in the product output from the peeling system. The peel control system may be configured to control the aggressiveness of the primary peeler for example. The peel control system may be further configured to control the volume of product sent to the second peeler. The peel control system may be configured to only control the volume of product sent to the second peeler. It will be appreciated that the peel control system may be configured to control this volume by controlling the sorting parameters of the sorting device until the desired volume of product being sent to the second peeler is achieved.

These examples are non-limiting. There are multiple ways to configure the peel control system according to the present invention, using information determined at one or multiple points throughout the peeling system. Likewise there are multiple components of the peeling system which may be controlled by the peel control system. There are multiple parameters which may be changed throughout the peeling system by the peel control system in accordance with the present invention. The whole system is dynamic in this regard.

The present invention allows for the ability to set a desired grade of peeled product. The peel control system is able to control the peeling system to output product of the desired grade once set. The peeler and sorter work together to provide the desired grade peeled product. The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A peeling system comprising:
a primary peeling device;
a sorting device arranged to sort product output from the primary peeling device into peeled product and partially peeled product;
a secondary peeling device arranged to receive the partially peeled product output from the sorting device; and
a peel control system configured to control the peeling system to output product of a desired grade, the peel control system configured to:
monitor peel quality of product detected in at least one position after the primary peeling device; and
control how much peel is removed during peeling and control a volume of product sent to the second peeler by sorting parameters of the sorting device until a desired volume of product being sent to the second peeler is achieved.

2. The peeling system of claim 1 wherein the peel control system is configured to adjust a peel aggressiveness of the primary peeling device in response to the detected peel quality at the at least one position.

3. The peeling system of claim 1 wherein the peel control system is configured to control a sort quality of the sorting device in response to the detected peel quality at the at least one position.

4. The peeling system of claim 1 wherein the at least one position comprises the output of the primary peeling device.

5. The peeling system of claim 1 wherein the at least one position comprises the input of the secondary peeling device.

6. The peeling system of claim 1 wherein the at least one position comprises the output of the secondary peeling device.

7. The peeling system of claim 6 wherein the peel control system is configured to adjust a peel aggressiveness of the secondary peeling device in response to the detected peel quality at the output of the secondary peeling device.

8. The peeling system of claim 1 wherein the at least one position comprises an output of the sorting device.

9. The peeling system of claim 1 further comprising a secondary sorter configured to divert product that is insufficiently peeled back into the secondary peeling device for more peeling.

10. The peeling system of claim 1 further comprising means for conveying product from an output of the secondary peeling device through the sorting device, separate from the flow from the primary peeling device.

11. The peeling system of claim 1 wherein the peel control system is configured to monitor the peel quality of product using data from the sorting device.

12. The peeling system of claim 1, wherein the secondary peeling device is distinct from the primary peeling device.

13. The peeling system of claim 1, wherein the sorting device is free of output from the secondary peeling device.

14. A peeling process comprising:
peeling product using a primary peeling device;
sorting product output from the primary peeling device into peeled product and partially peeled product;
re-peeling the partially peeled product; and
controlling the peeling process to output product of a desired grade in response to the peel quality at at least one position by:
monitoring the peel quality of product detected in the at least one position after the primary peeling device; and
controlling how much peel is removed during the peeling process, and controlling the volume of product sent to a second peeler by sorting parameters of the sorting device until a desired volume of product being sent to the second peeler is achieved, in response to the detected quality of product flow at the at least one position.

15. The peeling process of claim 14, further comprising adjusting a peel aggressiveness of the primary peeling device in response to the detected quality at the at least one position.

16. The peeling process of claim 14 wherein controlling the peeling process further comprises controlling a sort quality of the sorting in response to the detected peel quality at the at least one position.

17. The peeling process of claim 14, wherein the secondary peeling device is distinct from the primary peeling device.

18. The peeling process of claim 14, wherein the sorting device is free of output from the secondary peeling device.

19. A computer-readable storage medium comprising instructions which, when executed by a computer, cause the computer to carry out a peeling process comprising:
controlling a primary peeling device to peel product;
controlling sorting of product output from the primary peeling device into peeled product and partially peeled product;
controlling re-peeling of the partially peeled product in a secondary peeling device; and
controlling the peeling process to output product of a desired grade in response to the peel quality at at least one position by:
controlling monitoring of the peel quality of product detected in the at least one position after the primary peeling device;
controlling how much peel is removed during the peeling process and controlling the volume of product sent to a second peeler, in response to the detected quality of product flow at the at least one position.

* * * * *